W. D. GOLD.
WRENCH.
No. 188,243. Patented March 13, 1877.
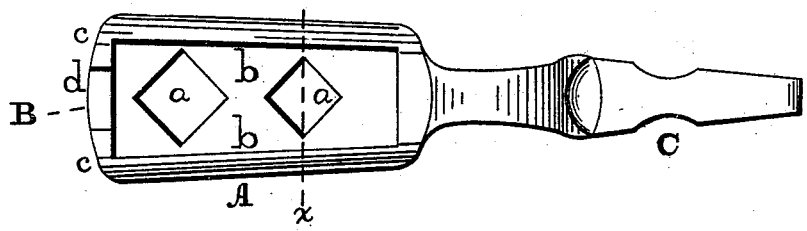
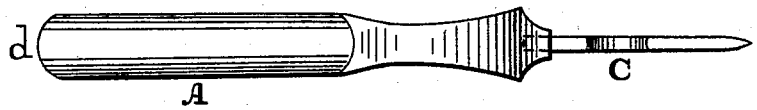
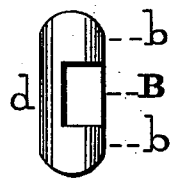
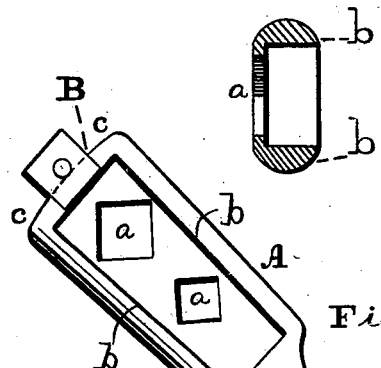
Witnesses:
A. P. Grant.
L. F. Brow(?)
Inventor:
Willis D. Gold.
by John A. Wiedersheim
Atty.

UNITED STATES PATENT OFFICE.

WILLIS D. GOLD, OF PHILADELPHIA, PENNSYLVANIA.

IMPROVEMENT IN WRENCHES.

Specification forming part of Letters Patent No. 188,243, dated March 13, 1877; application filed April 14, 1875.

*To all whom it may concern:*

Be it known that I, WILLIS D. GOLD, of the city and county of Philadelphia, and State of Pennsylvania, have invented a new and useful Improvement in Wrenches; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a face view of the device embodying my invention. Fig. 2 is a side view thereof. Fig. 3 is an end view thereof. Fig. 4 is a transverse section in line $x\ x$, Fig. 1. Fig. 5 is a face view, showing the operation thereof.

Similar letters of reference indicate corresponding parts in the several figures.

My invention relates to an improvement on the Letters Patent granted May 14, 1867; and consists in a screw-driver attached to a triple wrench, constructed of the double wrench, which has an additional wrench so arranged that nuts and bolts occupying and to occupy inconvenient positions may be readily operated, the invention being more especially adapted for sewing-machines and household purposes.

Referring to the drawings, A represents the shank of the tool, which is provided at one side with a series of angular openings, $a$, of various size, and at the other with flanges $b$ $b$, which leave a space of tapering form, whereby nuts and bolt-heads of varying size may be embraced, and such as will not fit the openings $a$ will find proper places between the flanges $b$. The side flanges $b$ are continued inwardly, as at $c\ c$, at one end, $d$, of the shank A, and have a longitudinal space, B, left between the ends of the continued parts $c\ c$; or the side flanges may be connected by a full flange, from which is removed a piece equal to the space B. This space B constitutes a wrench for loosening and tightening nuts and bolts which cannot be engaged with by the flanges $b$ or openings $a$, and it is also so located that the tool or shank may be moved into places where nuts and bolts are difficult of access, whereby the whole leverage of the shank is available for applying full power and conveniently operating the nuts and bolts. At the end of the shank A opposite to the wrench B I secure a screw-driver, C, whose handle is said shank A, whereby the driver may be properly operated, and in a manner well known.

Having thus described my invention, what I claim as new, and desire to secure by Letters Patent, is—

The multiple tool consisting of the screw-driver C and a triple wrench, which is constructed of the shank A, with angular openings $a$ and longitudinal flanges $b\ b$, in combination with the flanges $c\ c$, inwardly continuous of the longitudinal flanges $b$, and forming the space B, extending in the longitudinal direction of the shank, substantially as and for the purpose set forth.

WILLIS D. GOLD.

Witnesses:
 JOHN A. WIEDERSHEIM,
 A. P. GRANT.